(12) United States Patent
Alexander et al.

(10) Patent No.: US 7,475,549 B2
(45) Date of Patent: Jan. 13, 2009

(54) THERMAL MANAGEMENT SYSTEM FOR A GAS TURBINE ENGINE

(75) Inventors: Eric Alexander, San Diego, CA (US); Gordon Jewess, San Diego, CA (US); Patrick Lydon, San Marcos, CA (US); Tammy Lane, San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 556 days.

(21) Appl. No.: 11/197,248

(22) Filed: Aug. 3, 2005

(65) Prior Publication Data

US 2007/0028589 A1    Feb. 8, 2007

(51) Int. Cl.
*F02C 7/052* (2006.01)
*F02C 7/06* (2006.01)
*F02C 7/12* (2006.01)

(52) U.S. Cl. ............... 60/772; 60/39.08; 60/39.092; 60/39.83; 415/121.2

(58) Field of Classification Search .......... 60/39.08, 60/39.092, 39.83, 772, 802, 804; 244/53 B; 310/56; 415/121.2; 416/94
See application file for complete search history.

(56) References Cited

U.S. PATENT DOCUMENTS

| | | | | |
|---|---|---|---|---|
| 1,963,398 A | * | 6/1934 | Blair | 310/56 |
| 1,963,401 A | * | 6/1934 | Clason | 310/56 |
| 3,751,907 A | * | 8/1973 | Anderson | 60/39.092 |
| 3,859,785 A | * | 1/1975 | Leto et al. | 60/802 |

* cited by examiner

*Primary Examiner*—Louis J Casaregola
(74) *Attorney, Agent, or Firm*—Carlson, Gaskey & Olds PC

(57) ABSTRACT

A thermal management system for a gas turbine engine includes a cooling airflow which enters through an air filter portion of a forward cover for filtration of particulate which may result in FOD to a rotational system of the engine. Filtered cooling airflow flows along a rotor shaft over and through a forward bearing, over and through a permanent magnet generator, then over and through an aft bearing to provide thermal management. Commensurate therewith, the cooling airflow atomizes and communicates a lubricant to the bearings. From the aft bearing, the cooling airflow merges with a primary airflow path from an intake which generally surrounds the forward cover.

15 Claims, 6 Drawing Sheets

THERMAL MANAGEMENT SYSTEM FOR A GAS TURBINE ENGINE

This invention was made with government support under Contract No.: F08635-03-C0002. The government therefore has certain rights in this invention.

BACKGROUND OF THE INVENTION

The present invention relates to a gas turbine engine and, more particularly, to thermal management of the bearing system for a miniature gas turbine engine.

Miniature gas turbine or turbojet engines (typically of 150 lbf thrust and smaller) are often utilized in single usage applications such as reconnaissance drones, cruise missiles, decoy and other weapon applications, including air-launched and ground-launched weapon systems. The use of such an engine greatly extends the range of the weapon in comparison to the more conventional solid fuel rocket engine.

To achieve economically feasible extended range expendable propulsion sources for such applications, it is necessary that the miniature gas turbine engines be manufactured relatively inexpensively yet provide the highest degree of starting and operational reliability when launched from air or ground systems. One component that greatly affects mechanical performance and reliability is the high speed bearings which support the rotating turbine machine. Reliability and efficiency of the bearing system is a priority for a successful expendable turbine engine. Such reliability and efficiency of the bearing system may be compromised through foreign object damage (FOD), inadequate thermal management, or inadequate lubrication distribution.

Current gas turbine bearing systems employ a relatively complex closed circuit lubrication scheme which is relatively expensive to manufacture and difficult to maintain over long term storage typical of single use systems. Other gas turbine bearing systems utilize open air flow-through systems which, although providing satisfactory thermal management, directly subject the rotating components to FOD which may increase the potential of an operational failure.

Accordingly, it is desirable to provide an uncomplicated and inexpensive thermal management and lubrication system for a miniature gas turbine engine which facilitates storage yet assures operational reliability.

SUMMARY OF THE INVENTION

A thermal management system according to the present invention for a gas turbine engine includes a rotor shaft rotationally mounted to a forward bearing and an aft bearing. A forward housing supports the forward bearing and a forward cover is mounted thereto forward of the rotor shaft. The forward cover includes an air filter portion located generally along an axis of rotation of the rotor shaft. The air filter portion filters cooling airflow which enters the internals of the gas turbine engine for thermal management of the rotational system. The cooling airflow enters separate from a primary airflow which enters an intake.

The cooling airflow enters through the air filter portion where it is filtered for particulates which may result in FOD to the rotational system. From the air filter portion, filtered cooling airflow flows over and through the forward bearing, along the rotor shaft, over and through a permanent magnet generator, then over and through the aft bearing to provide significant thermal management thereof. Such cooling airflow significantly improves reliability while permitting increased rotor shaft rotation speeds which increases thrust output.

From the aft bearing, the cooling airflow merges with a primary airflow path from the intake where the primary airflow continues through to the compressor wheel and into the combustion system.

The forward housing also includes a lubrication passage which communicates a bearing lubricant such as fuel, oil or a mixture thereof to the bearings. The cooling airflow atomizes and communicates the lubricant onto the bearings. Such atomization still further improves reliability while permitting increased rotor shaft rotation speeds to increase thrust output.

The present invention therefore provides an uncomplicated and inexpensive thermal management and lubrication system for a miniature gas turbine engine which facilitates storage yet assures operational reliability.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
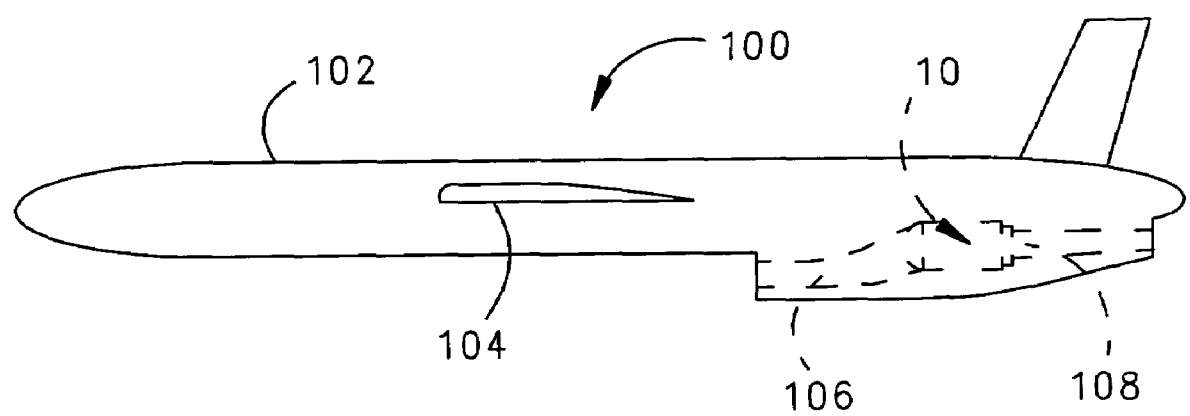
FIG. 1 is a general perspective view of an exemplary vehicle embodiment for use with the present invention.

FIG. 1 illustrates a general schematic view of a vehicle 100 including a miniature gas turbine engine 10 according to the present invention. The vehicle 100 includes a body 102 and one or more aerodynamic surfaces 104. The engine 10 is coupled to, or within, the body 102. A vehicle inlet duct 106 provides air to the engine 10, and an exhaust duct 108 exhausts the thrust therefrom. The engine 10 of the invention may also be used in other single usage and reusable applications such as reconnaissance drones, cruise missiles, decoys and other weapon and non-weapon applications.

Figure 2:
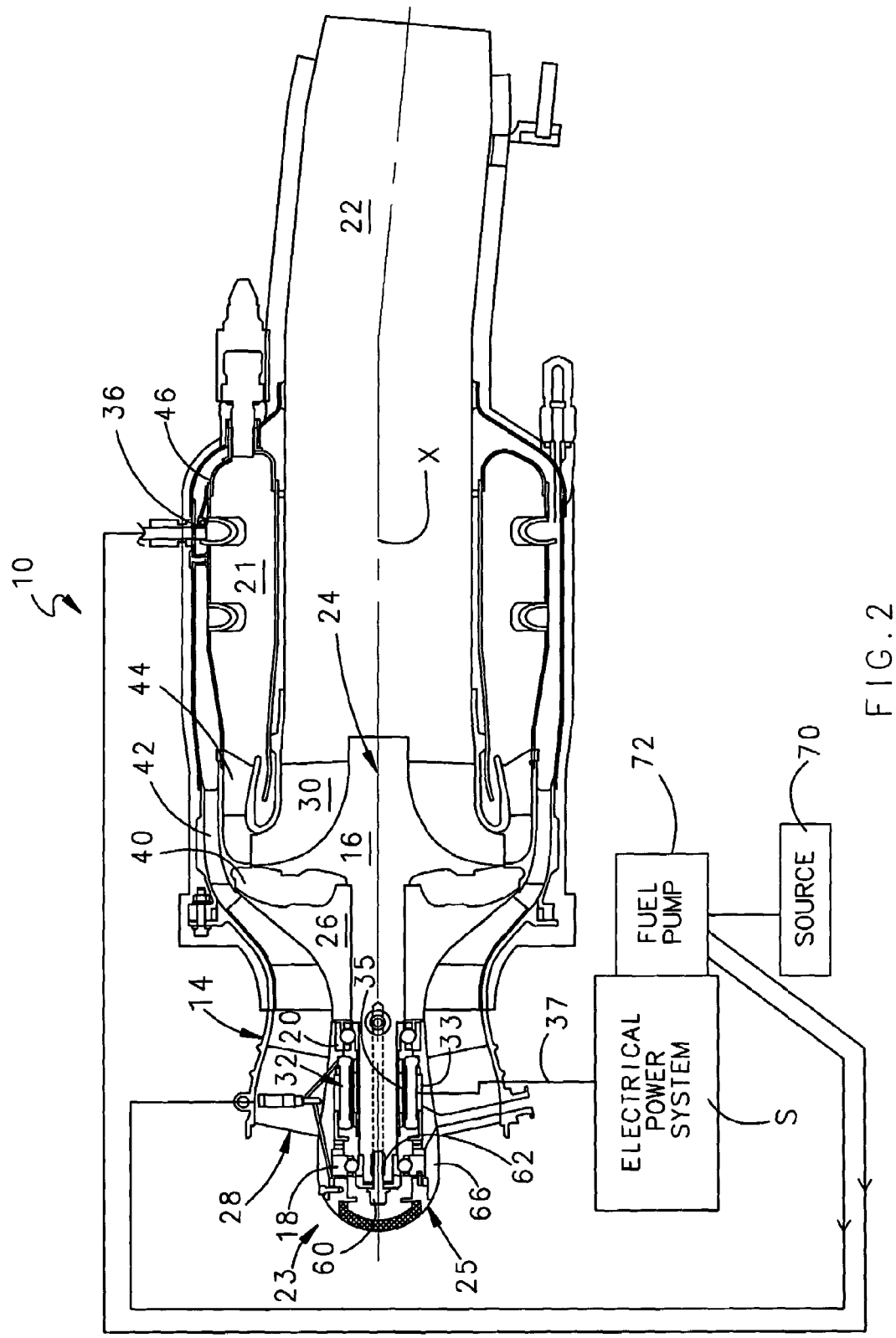
FIG. 2 is a schematic view of a gas turbine engine according to the present invention.

Referring to FIG. 2, the miniature gas turbine engine 10 generally includes a forward housing 14, a rotor shaft 16 rotationally mounted to a forward bearing 18 and an aft bearing 20, a combustion system 21 and an exhaust duct 22. The rotor shaft 16 rotates about a longitudinal axis X. It should be understood that other forms of rotating turbine machines, such as axial compressors and turbines, will also benefit from the present invention.

In the illustrated rotor configuration, a rotor system 24 includes a multiple of compressor blades facing forward toward an intake 28 to define a compressor wheel 26 and a multiple of turbine blades facing rearward toward the exhaust duct 22 to define a turbine wheel 30. The rotor shaft 16 is received in the bearings 18, and 20 and at least partially into an inlet cone 23 having a forward cover 25. The forward cover 25 of the inlet cone 23 is preferably the forward most portion of the engine 10 and defines an aerodynamically contoured shape which facilitates the delivery of undistorted, primary airflow to the intake 28.

A permanent magnet generator (PMG) 32 is preferably mounted to the rotor shaft 16 behind the forward bearing 18 to generate electrical power for the engine 10 and other accessories. The PMG 32 includes a stator 33 mounted within a forward housing inner support 66 of the forward housing 14 and a rotor 35 mounted to the rotor shaft 16. An electrical power wire 37 communicates electrical power from the PMG 32 to an electrical power system (illustrated schematically at S).

A fuel pump (illustrated schematically at 72) is preferably driven by the electrical power system S to communicate fuel from a source 70 to an annular combustor liner 46 through a fuel manifold 36. The fuel is burned at high temperatures within the combustor liner 46 such that the expanding exhaust gases therefrom are communicated to the turbine wheel 30. The combustor liner 46 interfaces with the exhaust duct 22 such that exhaust gases from the combustor liner 46 are directed through a turbine nozzle assembly 44, through to the turbine wheel 30, through the exhaust duct 22 and exiting the exhaust duct 108 of the vehicle for generating thrust.

Figure 3:
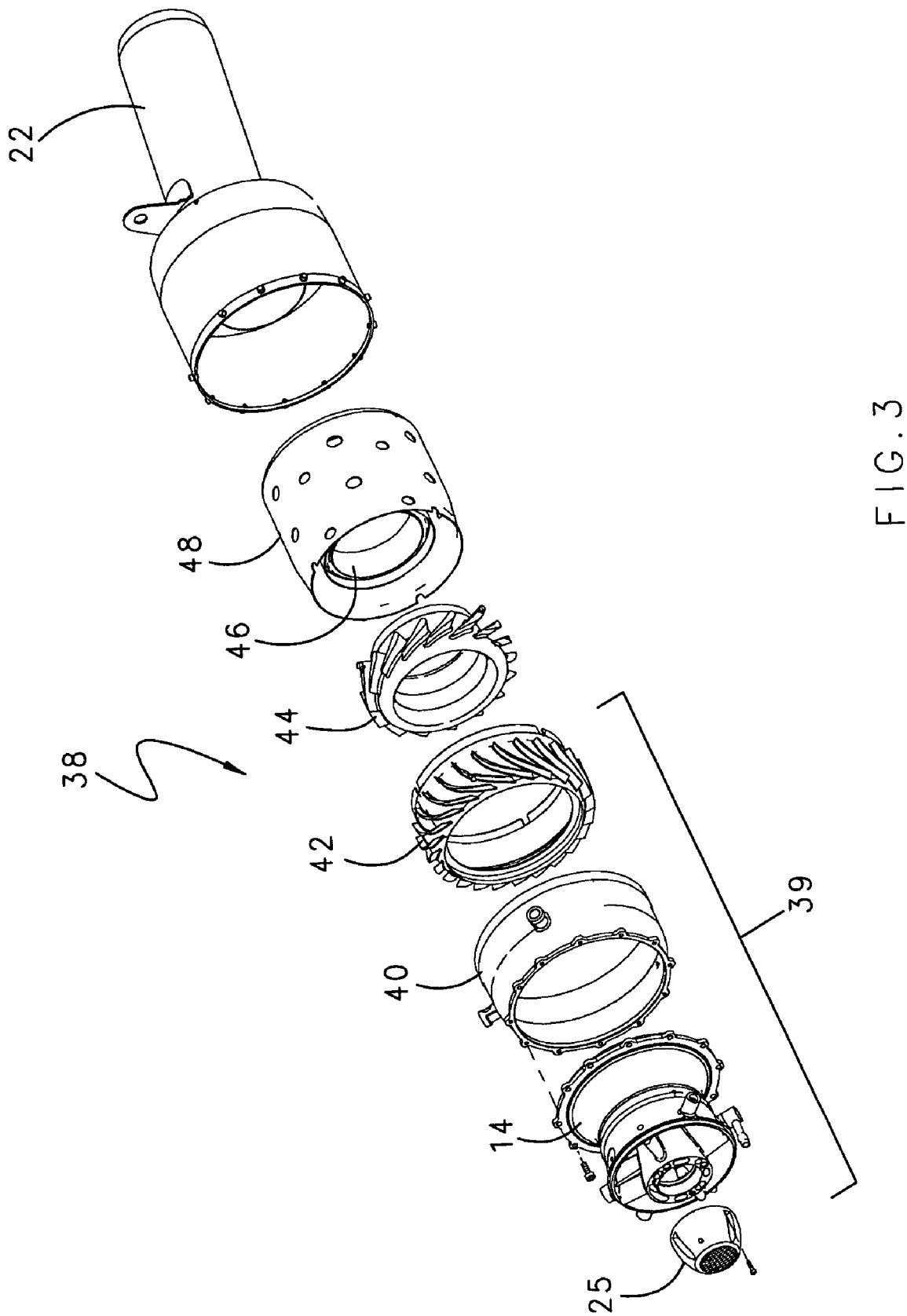
FIG. 3 is a perspective exploded view of a gas turbine engine static structure separated into its constituent components.

Referring to FIG. 3, static structure 38 of the engine 10 defines a thermal management system 39 of the engine 10. The thermal management system 39 is generally a passive system which receives and directs airflow along a cooling airflow path which flows within the static structure 38. That is, the "cooling airflow" as utilized herein is a portion of the airflow which enters into the engine and is then separated from a primary airflow path to cool components within the static structure prior to being rejoined into the primary airflow path for combustion. The cooling airflow preferably also directs a fluid lubricant to further assure reliable thermal management.

The static structure 38 generally includes the forward housing 14, the forward cover 25, a nozzle plate 40, a diffuser 42, the turbine nozzle assembly 44, a combustor liner 46, a combustor housing 48 and the exhaust duct 22. Preferably, each static structure component 14, 25, 40, 42, 44, 46, 48 and 22 is assembled together (FIG. 2) by one or more known techniques such as the relatively low cost fastening techniques of threaded fasteners, welding, v-band clamps, rivets, or the like. One of ordinary skill in the art in combination with the disclosure of the present application will readily determine the appropriate fastening technique for the particular component interface. It should also be understood that other static structure arrangements will also be usable with the present invention.

Figure 4:
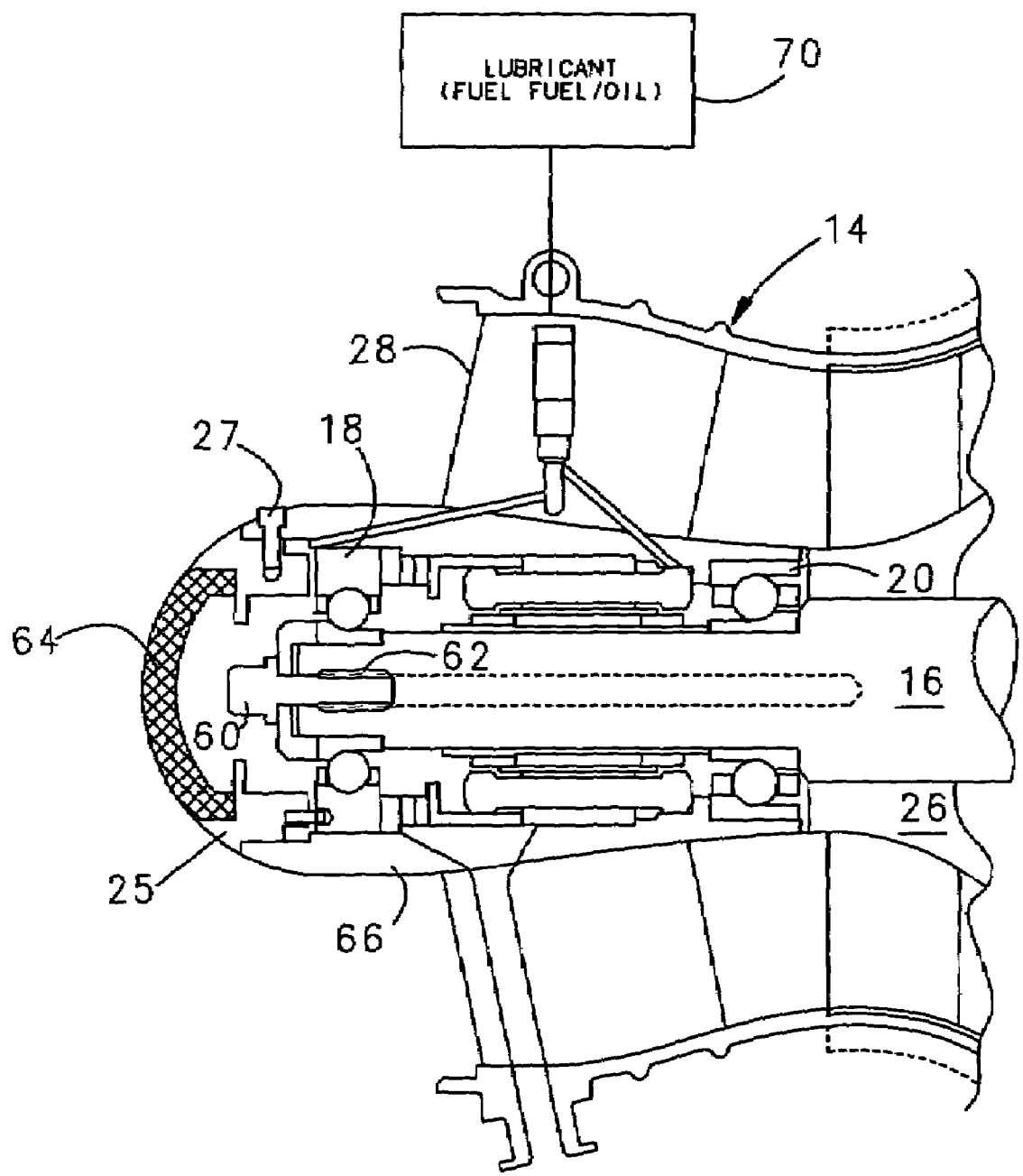
FIG. 4 is an expanded view of a thermal management system for a gas turbine engine.

Referring to FIG. 4, the rotor shaft 16 is preferably mounted axially with a single threaded fastener 60 such as a threaded rotor nut or bolt mounted to a correspondingly threaded shaft end portion 62 for retention within the static structure 38. The forward housing inner support 66 preferably supports the forward bearing 18 and the aft bearing 20. The forward housing 14 provides the primary static structural support for rotation of the rotor shaft 16 and rotational components mounted for rotation therewith. The threaded fastener 60 extends at least partially within and is protected within the forward cover 25 which is mounted to the forward housing 14 with cover fasteners 27 or the like. Removal of the forward cover 25 facilitates assembly and disassembly by providing access to the threaded fastener 60.

Figure 5:
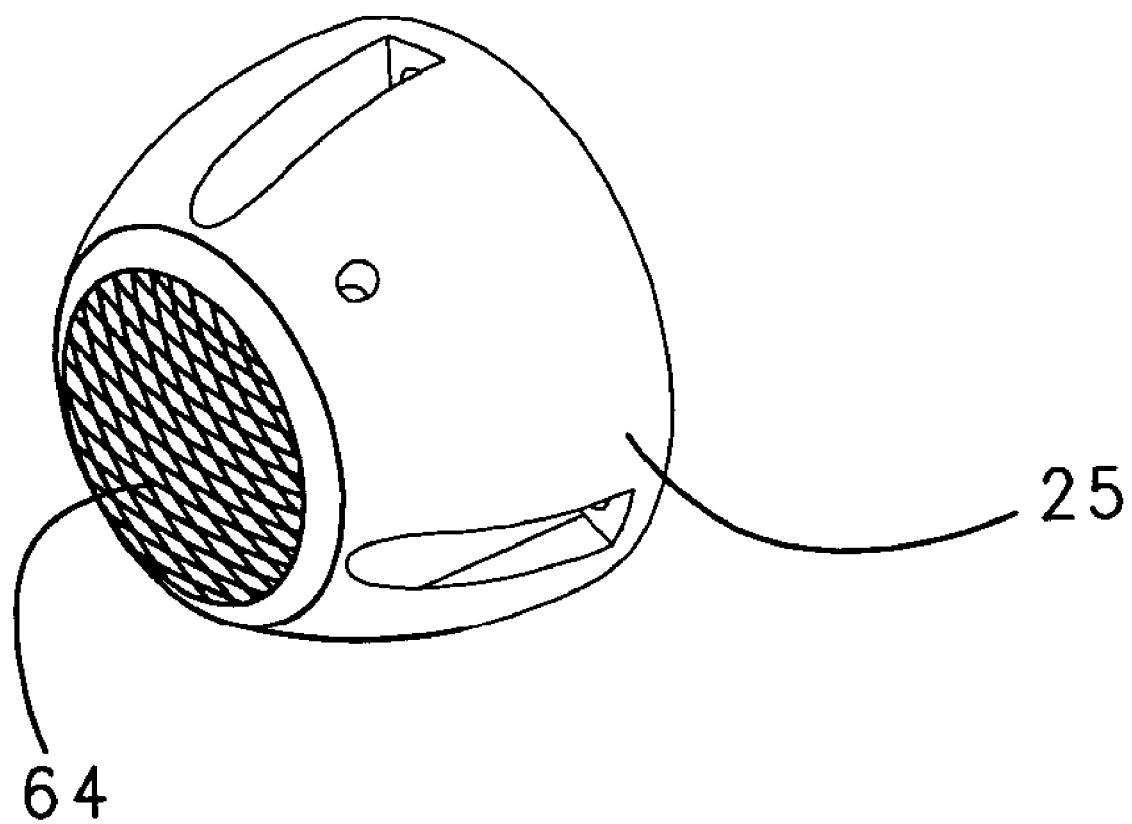
FIG. 5 is an expanded view of a forward cover.

The forward cover 25 includes an air filter portion 64 located generally along the axis X (also illustrated in FIG. 5). The air filter portion 64 is porous, such as a mesh filter like model number 4952488 manufactured by EJAY FILTRATION INC, of Riverside, California USA. The air filter portion 64 permits filtered air to flow into the miniature gas turbine engine 10 internals from a source other than along the primary airflow path defined by the intake 28.

Figure 6:
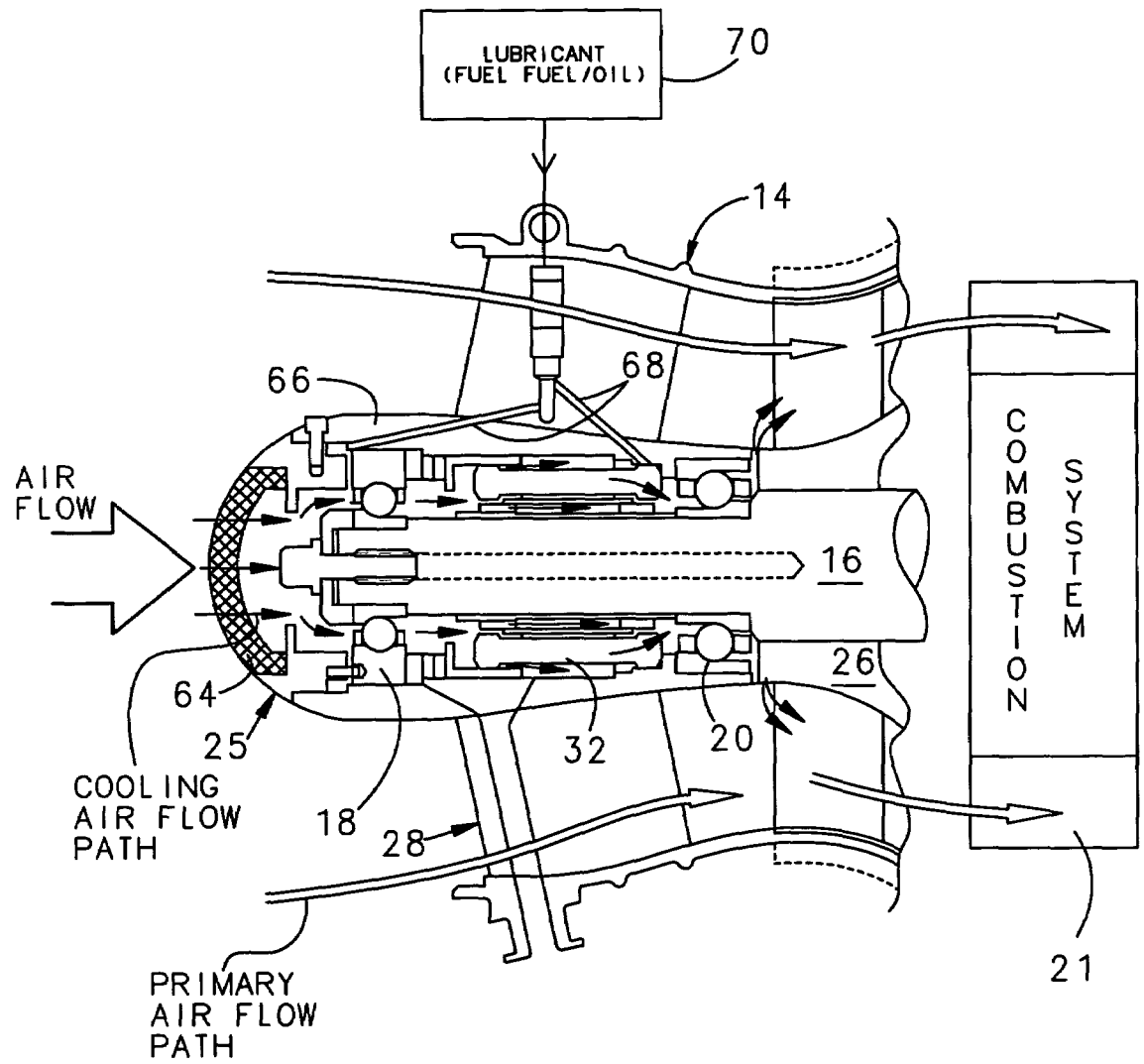
FIG. 6 is a schematic view of a cooling airflow and a primary airflow which flows through the gas turbine engine.

Referring to FIG. 6, airflow enters through the air filter portion 64 of the forward cover 25. The air filter portion 64 removes particulates from the airflow which may result in FOD to the rotational system. From the air filter portion 64, filtered cooling air flows over and through the forward bearing 18, along the rotor shaft 16, over and through the PMG 32, then over and through the aft bearing 20 to provide significant thermal management. Such cooling airflow significantly improves reliability while permitting increased rotor shaft rotation speeds which increases thrust output.

The filtered airflow is generally contained and directed through the forward housing inner support 66 of the forward housing 14. From the aft bearing 20, the cooling airflow merges with the primary airflow path received from the intake 28 where the combined airflow continues through the compressor wheel 26, and into the combustion system 21.

The forward housing 14 includes a lubrication passage 68 which transports a bearing lubricant such as fuel, oil or a mixture thereof from the source 70 (illustrated schematically) to the bearings 18 and 20. It should be understood that although only a single lubricant passage 68 to each bearing 18, 20 is illustrated in the sectional view, a multiple of lubricant radial passages 68 can also communicate with the bearings 18, 20 at a plurality of radial locations thereabout.

Openings from the lubricant passage 68 are in direct communication with the cooling airflow. The cooling airflow atomizes and transports the lubricant such that the lubricant is essentially sprayed onto the bearings 18, 20. Such atomization still further improves reliable operation as the bearings 18, 20 are provided with a more consistent application of lubrication. Furthermore, lubricant which collects aft of the forward bearing 18, is driven toward the aft bearing 20 and into the combustion system 21 by the cooling airflow. Notably, as the lubricant is preferably fuel or a fuel oil mixture, engine efficiency is maintained since the lubricant is ultimately communicated to the combustion system 21 for combustion and thrust generation.

It should be understood that relative positional terms such as "forward," "aft," "upper," "lower," "above," "below," and the like are with reference to the normal operational attitude and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A thermal management system for a gas turbine engine comprising:
   - a forward cover having a filter portion along an axis of rotation of a gas turbine engine;
   - a rotor shaft along said axis of rotation;
   - a forward rotor shaft bearing which rotationally supports said rotor shaft;
   - an aft rotor shaft bearing which rotationally supports said rotor shaft, said forward rotor shaft bearing and said aft rotor shaft bearing in communication with a cooling airflow from said filter portion; and a forward housing defined about said axis of rotation, said forward housing defining a lubrication passage directed toward said forward rotor bearing, said forward cover mounted to said forward housing.

2. The thermal management system as recited in claim 1, wherein said forward cover is forward of a rotor shaft defined along said axis of rotation.

3. A thermal management system for a gas turbine engine comprising:
a forward cover having a filter portion along an axis of rotation of a gas turbine engine;
a rotor shaft along said axis of rotation;
a forward rotor shaft bearing which rotationally supports said rotor shaft;
an aft rotor shaft bearing which rotationally supports said rotor shaft, said forward rotor shaft bearing and said aft rotor shaft bearing in communication with a cooling airflow from said filter portion; and
a permanent magnet generator (PMG) mounted to said rotor shaft, said PMG mounted between said forward rotor shaft bearing and said aft rotor shaft bearing.

4. The thermal management system as recited in claim 1, wherein said forward cover is mounted to a forward housing defined about said axis of rotation, said forward cover located forward of a rotor shaft which rotates about said axis of rotation.

5. A gas turbine engine comprising:
a rotor shaft defined along an axis of rotation;
a compressor wheel mounted to said rotor shaft;
at least one rotor shaft bearing which supports said rotor shaft;
a forward cover having a filter portion adjacent said rotor shaft;
a forward housing which defines a forward housing inner support and an air intake to communicate airflow toward said compressor wheel, said forward cover mounted to said forward housing such that cooling airflow through said filter portion is communicated through said forward housing inner support toward said at least one rotor shaft bearing, said forward housing defines at least one lubricant passage directed toward said at least one rotor shaft bearing such that said lubricant passage is in communication with said cooling airflow.

6. The gas turbine engine as recited in claim 5, wherein said at least one rotor shaft bearing includes a forward rotor shaft bearing and an aft rotor shaft bearing mounted to said rotor shaft.

7. The gas turbine engine as recited in claim 5, wherein said forward housing inner support retains said at least one bearing.

8. The gas turbine engine as recited in claim 5, wherein said forward housing defines at least one lubricant passage directed toward said at least one rotor bearing, said lubricant passage in communication with said cooling airflow.

9. The gas turbine engine as recited in claim 5, further comprising:
a fastener threaded to a threaded end segment of said rotor shaft, said filter portion forward of said threaded end segment.

10. The gas turbine engine as recited in claim 9, wherein said forward cover at least partially receives said fastener therein.

11. The gas turbine engine as recited in claim 5, wherein said gas turbine engine produces at a maximum, less than 150 pounds of thrust.

12. A method of thermal management for a gas turbine engine comprising the steps of:
(1) communicating a cooling airflow through a filter portion along an axis of rotation of a rotor shaft having a compressor wheel, the cooling airflow in communication with at least one rotor bearing which supports the rotor shaft;
(2) merging the cooling airflow into a primary airflow path downstream of the at least one bearing, the primary airflow path in communication with the compressor wheel; and
(3) communicating the cooling airflow past a lubricant passage to at least partially atomize a lubricant therefrom such that atomized lubricant is received onto the at least one bearing.

13. A method as recited in claim 12, further comprising the step of:
(4) communicating a primary airflow along the primary airflow path from an intake defined at least partially about the periphery of a forward cover which supports the filter portion.

14. A method as recited in claim 12, further comprising the step of:
(4) communicating the cooling airflow through a forward housing inner support; and
(5) supporting the at least one bearing within the forward housing inner support.

15. A gas turbine engine comprising:
a rotor shaft defined along an axis of rotation;
a compressor wheel mounted to said rotor shaft;
a forward housing which defines a forward housing inner support and an air intake to communicate a primary airflow toward said compressor wheel; and
a forward cover having a filter portion forward of said rotor shaft and radially inward of said air intake, said forward cover mounted to said forward housing inner support such that a cooling airflow is communicated through said filter portion and into said forward housing inner support;
a forward rotor shaft bearing forward of said compressor wheel to rotationally support said rotor shaft;
an aft rotor shaft bearing forward of said compressor wheel and aft of said forward rotor shaft bearing to rotationally support said rotor shaft, said forward rotor shaft bearing and said aft rotor shaft bearing in communication with the cooling airflow, the cooling airflow communicated to merge with the primary airflow from the air intake upstream of said compressor wheel to provide a combined airflow toward the compressor wheel.

* * * * *